April 13, 1943.  L. J. J-B. CHÊNEAU  2,316,223
AUTOMOTIVE VEHICLE
Filed Nov. 17, 1939   3 Sheets-Sheet 2
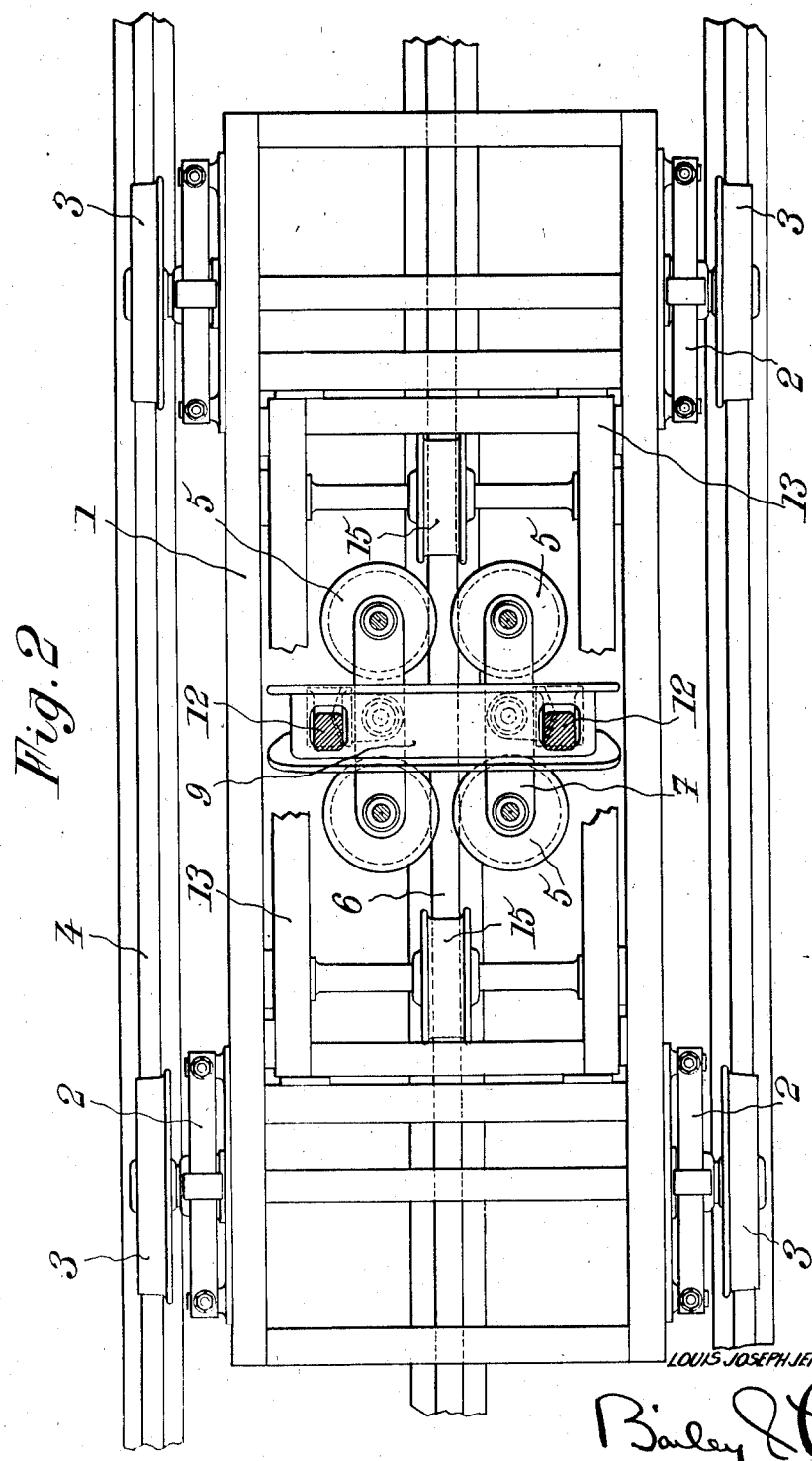
INVENTOR
LOUIS JOSEPH JEAN-BAPTISTE CHENEAU
BY   ATTORNEYS April 13, 1943.  L. J. J-B. CHÊNEAU  2,316,223
AUTOMOTIVE VEHICLE
Filed Nov. 17, 1939  3 Sheets-Sheet 3

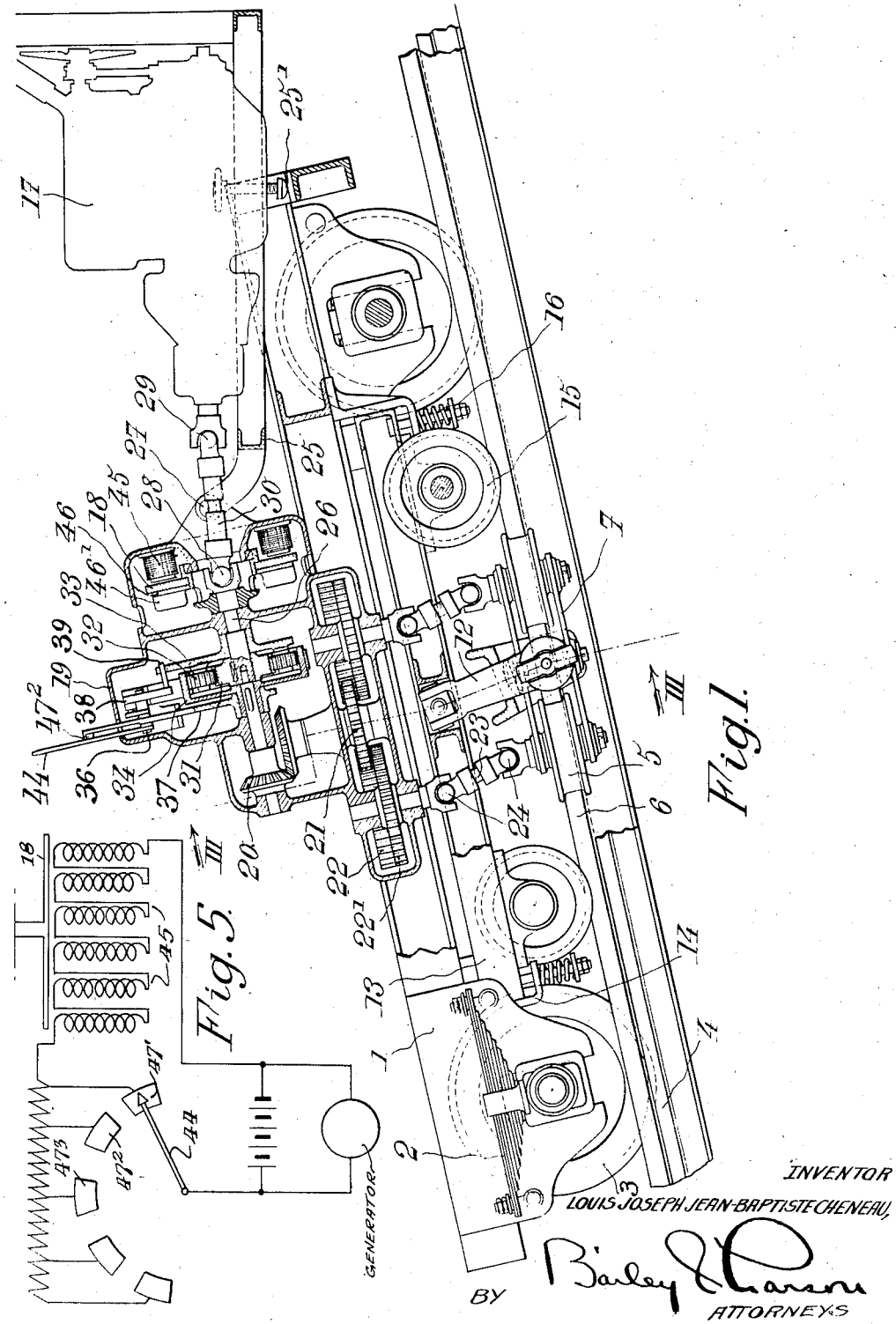

INVENTOR
LOUIS JOSEPH JEAN-BAPTISTE CHÊNEAU
BY
ATTORNEYS

Patented Apr. 13, 1943

2,316,223

UNITED STATES PATENT OFFICE 2,316,223

AUTOMOTIVE VEHICLE

Louis Joseph Jean-Baptiste Chêneau, Paris, France; vested in the Alien Property Custodian Application November 17, 1939, Serial No. 305,029
In Belgium November 23, 1938

9 Claims. (Cl. 105—30)

The present invention relates to automotive vehicles having propelling elements (such as wheels, caterpillars, or the like) at least some of which produce the displacement of the vehicle by cooperating, by adhesion, with a rolling track connected to the ground. This rolling track may be constituted, for instance, by one or several rails, or by a cable, as in the case of teleferic cabins. The invention is more especially, although not exclusively concerned, among these vehicles, with those intended to travel along steep gradients, where adhesion is a matter of primary importance.

The object of the present invention is to provide a vehicle of the type above referred to which is better adapted to meet the requirements of practice than the vehicles used for the same purpose up to the present time.

According to an essential feature of the present invention, at least some of the propelling means of the vehicle are carried by a support adapted to undergo relative displacements with respect to the main frame of the vehicle, and means are provided for acting in the course, or even only at the end of these displacements, for varying the pressure of application of these propelling means on their rolling track in accordance with the value of the resistance to be overcome in order to obtain a forward movement of the vehicle.

Another feature of the present invention relates more particularly to vehicles of the type above described which are intended to run along inclined tracks, and it consists in providing said vehicles with brakes of the electro-magnetic type, including a rotor for slowing down the movement of the vehicle and arranging said braking mechanisms so that only one of the faces of the rotor is located opposite electro-magnets intended to produce, when they are energized, the braking action, the other face of said rotor being subjected to the action of cooling means.

Still another feature of the present invention consists in providing the vehicle with electromagnetic braking means and with safety means for preventing an uncontrollable acceleration of the vehicle in case of breakdown of the vehicle, and connecting both of said means to a single control member which unlocks the safety device only after the braking means have been brought into the position corresponding to the maximum braking action, further displacement of said control member acting gradually to reduce the action of the braking means.

Other features of the present invention will result from the following detailed description of some specific embodiments thereof.

A preferred embodiment of the present invention will be hereinafter described with reference to the accompanying drawings, given merely by way of example, and in which:

Fig. 1 is an elevation, with parts in section, of an automotive vehicle made according to the invention;

Fig. 2 is a plan view corresponding to Fig. 1;

Fig. 5 is a circuit diagram of the brake control.

Figure 3:
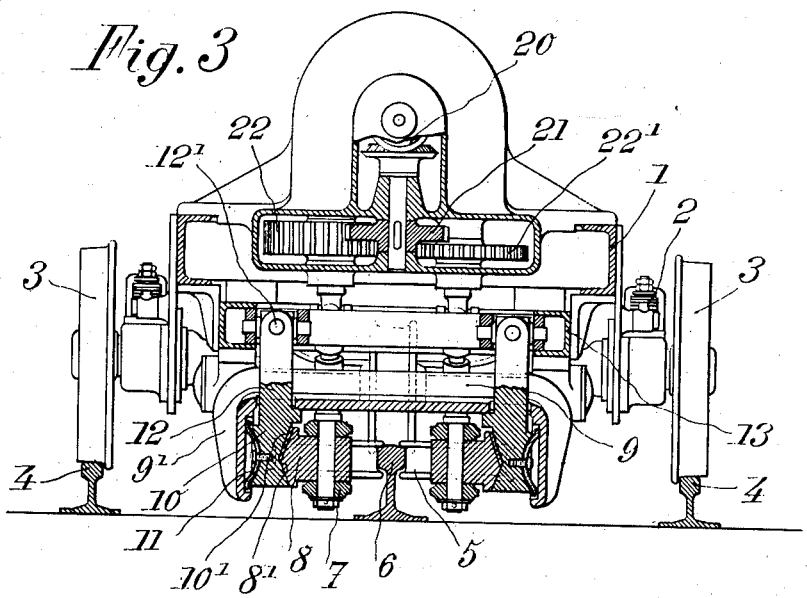
Fig. 3 is a transverse section on the line III—III of Fig. 1.

In the following description the invention is applied to a vehicle intended to travel by adhesion along a railway track running along steep gradients, for instance along a hill.

This vehicle includes the following elements:

On the one hand, a main frame 1, on which is mounted the load to be carried, said frame being supported, preferably through springs 2, by wheels 3 bearing on rails 4.

On the other hand, propelling means constituted by wheels 5 having their axes at right angles to the plane of the track. In the example disclosed, there are four propelling wheels arranged by groups of two on either side of a central rail 6 and bearing against the sides of said rail.

According to the essential feature of the present invention, said wheels 5 are mounted on a support adapted to undergo relative displacements, preferably parallel to the plane of the track, with respect to frame 1.

Additionally, I provide means, adapted to act in the course, or even only at the end, of said relative displacements, for regulating the pressure of application of wheels 5 on central rail 5 in accordance with the value of the resistance to be overcome for moving the vehicle along its rolling path.

Furthermore, preferably, these means act in the case in which frame 1 tends to run ahead of wheels 5 as well as the case in which said frame tends to lag behind said wheels.

It will be understood that, in this way, most of the weight of the vehicle and the whole of the loads carried by frame 1 will help in increasing the adherence of wheels 5 to the track when the vehicle is running along a gradient, contrary to the operation of vehicles in which the frame and the driving wheels always move as a whole.

It is thus possible to reduce to a minimum the dead weight which does not serve to vary the adhesion of the wheels in accordance with the gradient of the track.

Furthermore, such means allow distribution among the respective wheels 5 of the pressures which provide the total adhesion of the driving wheels sufficient for ensuring the movement of the vehicle and, therefore the effort of application exerted on each wheel through the intermediary of its axle bearings is reduced to an acceptable value.

According to the preferred embodiment, each of the wheels 5 of the two groups of driving wheels is arranged at the ends of two beams 7 which, in turn, are pivoted, at their respective mid points to a block 8 provided with a helical inclined surface $8^1$. These two blocks 8 are connected together, through the intermediary of parts which will be hereinafter described, by a cross piece 9, located above beams 7, and provided with two bent ends $9^1$.

Between each block 8 and the corresponding end $9^1$ of cross piece 9, a block 10 having a helical inclined surface $10^1$ coacts with inclined surface $8^1$ when relative displacements of said blocks with respect to one another occur. An elastic system, including, a spring, 11 is provided between the end $9^1$ of said cross piece 9 and the corresponding block 10, so as to produce in all cases a pressure of application of wheel 5 on the central rail 6.

This block 10 is connected to frame 1 in such manner that, in the case of relative displacements of said frame and of the driving wheels 5, inclined surfaces $10^1$ coact with inclined surfaces $8^1$ so as to apply said driving wheels with a higher pressure on rail 6.

This result is obtained in the following manner:

Each block 10 is fixed to one end of an arm 12 (which lies substantially vertical in its mean position when the vehicle runs on a level) the other end of which is connected, through a double pivot $12^1$, to an auxiliary frame 13. This frame 13 is moved by the displacements of frame 1 parallel to the plane of the track by abutments, comprising L-shaped pieces 14, which however permit relative displacements of the above mentioned frames in a direction perpendicular to the plane of the track.

The auxiliary frame 13 is supported by wheels 15 two of which wheels bear on the central rail 6. An elastic system, comprising springs 16 of high flexibility are between frame 13 and frame 1, so that supporting wheels 15 are always applied on rail 6 with a force sufficient to prevent detrimental reboundings of the whole of the propelling carriage.

The motor, or driving, system of the vehicle is secured on the frame. According to the embodiment shown by the drawings, this system is made in the following manner:

A motor or engine 17 drives, preferably through a brake 18 and a safety device 19, which will be hereinafter more fully described, and also through a pair of bevel wheels 20 and a toothed wheel 21, two pinions 22 located respectively in coaxial relation with each of the driving wheels 5 located on the same side of rail 6.

Each of these pinions 22 is arranged to coact with a pinion $22^1$ coaxially arranged with one of the driving wheels located on the other side of said rail, respectively.

The spindles of pinions 22 and $22^1$ are respectively coupled with each of the driving wheels in coaxial relation with which they are disposed, preferably through the intermediary of sliding joint shafts 23 each provided with a double Cardan joint, 24.

It should be noted that engine 17 is mounted on a support 25 which bears on a pivot $25^1$, whereby the inclination of the engine with respect to frame 1 may be altered as a function of the gradient of the track so as to keep the engine in substantially horizontal position.

For this purpose, pivot $25^1$ is vertically adjustable, support 25 being further pivoted to the frame carrying the driven shaft 26 about an axis 27 which is preferably chosen of such position that it is at equal distance from the centers of Cardan joints 28 and 29, provided at the ends of the driving shaft and the driven shaft. These two last mentioned shafts are coupled through a shaft 30 of the sliding joint type, in order to ensure a homokinetic transmission of the movement for all positions of support 25.

Before giving a more detailed description of safety device 19 and of slowing brake 18, I will first explain the action of the propelling system of the vehicle.

When the vehicle is stationary along a level portion of the track, wheels 5 are applied against the sides of the central rail 6 by the mere strength of springs 11. If wheels 5 are then turned, the whole of the propelling carriage tends to move forward with respect to frame 1, which is temporarily held stationary by the load it supports; arms 12 are inclined, and the action of inclined surfaces $8^1$ and $10^1$ causes the tension of springs 11 and therefore also the adhesion of wheels 5 on rail 6 to increase. When blocks 10 come into contact with the ends of cross piece 9, the pressure exerted on beams 7 increases, if additional traction be necessary, a value such that the adhesion of wheels 5 is sufficient for ensuring the forward displacement of the vehicle.

If now, there is an upward gradient, the resistance on frame 1 increases and, through the coaction of blocks 8 and 10, the pressure of application of wheels is given a new value which is higher than the preceding value. Inversely, when the gradient is in the downward direction, if frame 1 tends to drive wheels 5 forward, arms 12 are inclined in the opposed direction and the adhesion of said wheels will be proportional to the disturbing effort, which allows braking the vehicle by means of the engine since slipping of wheels 5 on rail 6 is avoided.

It further results, from the preceding description, that the pivoting arms 12 to an auxiliary frame 13 has the advantage of preserving the whole of the propelling system from reactions perpendicular to the track produced by vertical displacements of frame 1.

The safety device 19, is made so that, in case of stoppage of the engine, the vehicle cannot start in the backward direction if it is located on an upward gradient.

Advantageously, this device is constituted by a brake associated with engine 17 in such manner that, when the latter is running, the engine causes the brake to be released and, on the contrary, when said engine is stopped, the engine causes the brake to be applied proportionally to the disturbing effort which tends to produce an acceleration of the vehicle.

Figure 4:
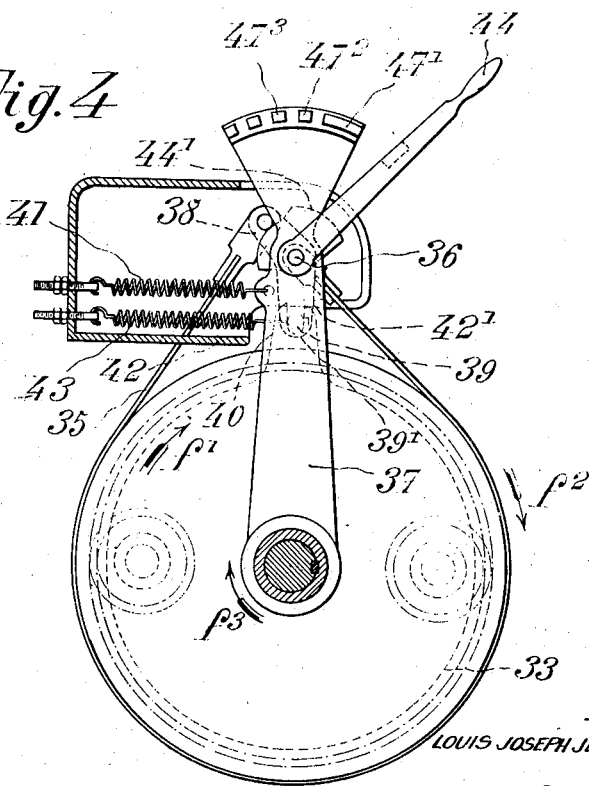
Fig. 4 is a diagrammatical view of a safety drive to be used in connection with the device according to the invention.

For this purpose, I use the embodiment illustrated by Figs. 1 and 4, according to which I provide on the transmission of the vehicle an epicyclic speed reducing gear. This gear includes a central pinion 31 driven by engine 17 and coacting, through the intermediary of planet wheels 32 mounted on an annular support 33, with an internal toothed wheel 34 coupled with the driven shaft and subjected, on its periphery, to the action of a brake 35 of the ribbon type capable of being actuated by relative rotations of the planet wheel carrier 33.

In this embodiment of the present invention, I pivot, on a spindle 36, carried by an arm 37 pivoted about the axis of the mechanism, a bent lever 38. To one of the arms of this lever, I fix one end of ribbon 35, the other end of which is fixed to a point of arm 37, preferably at the axis 36 thereof. The other end of this lever coacts, through the intermediary of a fork 39¹ and of a finger 39, with an arm 40 rigid with planet-wheel carrier 33.

When the planet-wheel carrier is urged by the engine in the direction indicated by arrow $f^1$ (annular member 34 being stationary), arm 40 tends to produce the release of the brake.

I provide, on the one end, a spring 41 which tends to bring arm 37 against an abutment 42 carried by the casing, and, on the other hand, a spring 43 attached to arm 40, as shown in Fig. 4, so as to create an initial tension of brake ribbon 35 when arm 37 is applied against the above mentioned abutment 42.

The system further includes a lever 44 keyed on the spindle of bent lever 38, so as to provide for the release of the brake, for instance through the action of a cam 44¹ of any suitable shape.

The mechanism just above described works in the following manner:

At the beginning, when no load is acting on the mechanism, spring 41 brings arm 37 against abutment 42 and spring 43 produces a certain initial application of the brake. If the vehicle is then engaged on a gradient, the engine being stopped, annular member 34 tends to turn in the direction of arrow $f^2$. Arm 37 is driven, owing to the tension of ribbon 35, against the action of spring 41, and it is caused to occupy a new position, in which bent lever 38 bears against an abutment 42¹ located opposite abutment 42. From this time on, any supplementary effort tending to displace annular member 34 in the direction of arrow $f^2$ will produce a pivoting of lever 38 so that the tension of ribbon 35 will be consequently increased. Thus, the braking effort will be proportional, automatically, to the intensity of the load applied on annular member 34. In particular, the dimensions of the various parts are so dimensioned that said annular member is always stopped, whatever be the value of the load. If, now, it is desired to drive the vehicle to move forward against the reaction of this load, the engine is coupled with the transmission and pinion 31 starts turning in the direction of arrow $f_3$, causing planet wheels 42 to turn. These planet wheels, bearing on annular member 34, cause, through their spindles, the planet-wheel carrier 33 to be driven in the direction of arrow $f^1$. Finger 39 then coacts with fork 39¹ and lever 38 pivots in the direction which corresponds to the release of the brake. Springs 41 now have a preponderating action and arm 37 is brought back against abutment 42, in which position the brake is fully released. If the engine is again stopped or disconnected, annular member 34 is urged by the load that is applied thereto and the mechanism comes back into locking position.

An analogous result could be obtained by using, instead of the reaction of the planet wheel carrier, the direct antagonistic torque applied to the engine frame for releasing the brake.

The brake 18 is preferably of the electro-magnetic type, and includes a rotor 18 rotating together with the shaft to be braked, this rotor moving opposite a plurality of electro-magnets 45 which produce, across said rotor, Foucault currents which in turn react on the field of said electro-magnets so as to produce a resistance against the rotation of said rotor.

According to a particular feature of the invention, said electro-magnetic brake is arranged in such manner that all the electro-magnets are located opposite the same face of rotor 18, the other face of said rotor being subjected to the action of cooling means.

Although these cooling means can be made in many different ways, it is particularly advantageous to use a disc 46, preferably fitted with fins 46¹ which are fitted on the face of the rotor to be cooled, in order to improve the cooling of the brake, this disc being made of a metal which is a good conductor of heat, for instance aluminium.

Finally, this electro-magnetic brake is completed by a rheostat system which permits adjustment of the intensity of energizing of electro-magnets 45, and therefore the braking intensity.

It should be noted that it is advantageous to feed the coils of the electro-magnets 45 by means of a dynamo driven by one of the axles of the vehicle through the intermediary of a free-wheel device which ensures the drive in the direction corresponding to downward displacement, said dynamo being preferably connected in shunt with the battery of the vehicle, whereby said battery can ensure the energizing of said coils in case of failure of the dynamo.

According to another feature of the invention, the safety device 19 and the brake 18 are operatively connected with a control member which permits release of device 19 only after electro-magnets 45 have been energized to the maximum, the subsequent displacement of said member being adapted gradually to reduce the action of the brake.

For this purpose I use the arrangement illustrated by Fig. 4 of the drawings in which the rheostat for operating the brake 18 is controlled by the operating lever 44 of the safety device. This lever is capable, while ensuring the passage of current through an elongated stud 47¹ corresponding to the maximum energizing of electro-magnets 45, of moving a distance sufficient for ensuring the release of device 19, the brake being gradually released when lever 44 is caused to coact successively with studs 47², 47³, and so on.

Moving lever 44 in the opposite direction produces a gradual slowing down of the vehicle, then its stopping as a result of the action of device 19.

Within the scope of the invention, I might utilize, for the adhesion of the driving wheels, instead of the central rail provided especially for this purpose, one of the two lateral rails, or even both of these lateral rails. Also the invention might be applied to vehicles other than land vehicles, for instance aerial conveying vehicles, the track on which the propelling means are applied being constituted, in this case, by an aerial cable or rail. Or again, the invention might be applied to vehicles running on pneumatic or other tires and provided with propelling wheels disposed on either side of a monorail. This last mentioned application is well adapted, in particular, to the case of automotive vehicles running on railway tracks to insure the adhesion of the vehicle's propelling wheels, such wheels being disposed on opposite sides of the rail respectively so as to grip the rail tightly when the body of the vehicle tends to move backwards with respect to said propelling wheels under the effect of the head resistance.

In a general manner, while I have, in the above description, disclosed what I deem to be practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A vehicle of the type described, adapted to run along a rolling track, including at least one rail, which comprises, in combination, a main frame, means adapted to run parallelly to said track, for supporting said main frame with respect to said track, a support movably supported by said main frame so as to be able to undergo relative movements with respect thereto in a direction parallel to said track, propelling wheels carried by said support adapted to run along said rail, and means, responsive to relative movement between said main frame and said support, for regulating the pressure of application of said propelling wheels with respect to said rail in accordance with the resistance to be overcome for causing the vehicle to move forward.

2. A vehicle of the type described, which is adapted to run along a rolling track, including at least one rail, comprising in combination, a main frame, means adapted to run parallelly to said track for supporting said main frame with respect to said track, an auxiliary frame slidable with respect to said main frame in two directions, one parallel to the plane of said track and the other perpendicular thereto, propelling means, movably carried by said auxiliary frame, adapted to run on said rail with a variable pressure, means for controlling said pressure, at least one arm pivoted both to said main frame and to said auxiliary frame, for controlling said pressure control means according to the relative position of said main frame and said auxiliary frame in the direction parallel to the plane of said track, and means carried by said vehicle for driving said propelling means.

3. A motor vehicle adapted to run along a rolling track, which comprises, in combination, an electro-magnetic braking device, a safety device adapted to prevent undue acceleration of the vehicle in case of failure of its motor, and a single control means for both of said devices, adapted to permit of releasing said safety device only after the braking device has been applied to the maximum, said control means being adapted, by further displacement, gradually to reduce the action of said braking device.

4. A vehicle of the type described, which comprises, in combination, propelling means adapted to cooperate with a rolling track, a main frame, means, adapted to run parallel to said track, for supporting said main frame with respect thereto, a support, adapted to undergo relative movements with respect to said main frame, for said propelling means, means, operative by said relative movements, for regulating the pressure of application of said propelling means on said rolling track according to the resistance to be overcome for causing the vehicle to move forward, an electro-magnetic braking device, a safety device adapted to prevent undue acceleration of said vehicle in case of break-down of its motor, and a single control means for both of said devices, adapted to permit of releasing said safety device only after the braking device has been applied to the maximum, said control means being adapted, by further displacement, gradually to reduce the action of said braking device.

5. A vehicle of the type described, adapted to run along a rolling track, including at least one rail, which comprises, in combination, a main frame, means adapted to run parallel to said track, for supporting said main frame with respect to said track, a support movably supported by said main frame so as to be able to undergo relative movements with respect thereto in a direction parallel to said track, propelling wheels carried by said support adapted to run along said rail, and means, responsive to movement of said support with respect to said main frame in the direction of travel, for regulating the pressure of application of said propelling wheels with respect to said rail in accordance with the resistance to be overcome for causing the vehicle to move forward.

6. A vehicle of the type described, adapted to run along a rolling track including at least one rail, which comprises, in combination, a main frame, means adapted to run parallel to said track for supporting said main frame with respect to said track, a support movably supported by said main frame so as to be able to undergo relative movements with respect thereto in a direction parallel to said track, propelling wheels carried by said support adapted to run along said rail, said support being comprised of elements forming a deformable parallelogram, means responsive to variations of the position of said support with respect to said main frame for altering said parallelogram and thereby regulating the pressure of application of said propelling wheels with respect to said rail in accordance with the resistance to be overcome for causing the vehicle to be moved forwardly, motor means on said main frame and transmission means connecting said propelling wheels and said motor means, said transmission means including articulated shafts of variable lengths.

7. A vehicle of the type described, adapted to run along a rolling track including at least one rail, which comprises, in combination, a main frame, means adapted to run parallel to said track for supporting said main frame with respect to said track, a support movably supported by said main frame so as to be able to undergo relative movements with respect thereto in a direction parallel to said track, propelling wheels carried by said support adapted to run along said rail, said support being comprised of elements forming a deformable parallelogram, means responsive to variations of the positions of said support with respect to said main frame for altering said parallelogram, cam means for regulating the pressure of application of said propelling wheels with respect to said rail, means responsive to variations in the shape of the deformable parallelogram to effect a consequent actuation of said cam means, tension means normally urging said propelling wheels toward said rail, the tension of said tension means in said direction being augmented by actuation of said cam means during the first part of the movement thereof in a direction resulting in application of greater pressure of said propelling wheels against said rail, and an abutment for engaging the outer surface of an element of said cam means during the second part of the movement of said cam means in said direction for limiting the movement of said cam means, motor means on said main frame and transmission means connecting said motor means and said propelling wheels.

8. A vehicle of the type described, adapted to run along a rolling track including at least one rail, which comprises, in combination, a main frame, means adapted to run parallel to said track for supporting said main frame with respect to said track, a support movably supported by said main frame so as to be able to undergo relative movements with respect thereto in a direction parallel to said track, propelling wheels carried by said support adapted to run along said rail, said support being comprised of elements forming a deformable parallelogram, means responsive to variations of the positions of said support with respect to said main frame for altering said parallelogram, said propelling wheels being carried by one of the sides of said parallelogram, cam means for regulating the pressure of application of said propelling wheels with respect to said rail, said cam means comprising an actuating element and an actuated element, a lever articulated by a Cardan joint to said movable support, said actuating element being secured to said lever, said lever being responsive to variations in the shape of the deformable parallelogram to effect a consequent actuation of said actuating element and consequently of said cam means.

9. A vehicle of the type described adapted to roll along a rolling track including at least one rail, which comprises, in combination, a main frame, means adapted to run parallel to said track for supporting said main frame on said track, a support, means swingably mounting said support on said main frame for movement of said support relative to said main frame in a direction parallel to said track and in a direction vertical with respect to said track, propelling wheels carried by said support adapted to run along said rail, and means responsive to the swinging movement of said support in said directions with respect to said main frame for regulating the pressure of application of said propelling wheels with respect to said rail in accordance with the resistance to be overcome for causing the vehicle to move along said track.

LOUIS JOSEPH JEAN-BAPTISTE CHÊNEAU.